United States Patent
McCoy et al.

(10) Patent No.: US 9,610,813 B2
(45) Date of Patent: Apr. 4, 2017

(54) INTEGRALLY FORMED GOOSENECK HITCH ASSEMBLY

(71) Applicant: Cequent Performance Products, Inc., Plymouth, MI (US)

(72) Inventors: Richard W. McCoy, Granger, IN (US); Jacob William Mitchell, Mishawaka, IN (US)

(73) Assignee: CEQUENT PERFORMANCE PRODUCTS, INC., Plymouth, MI (US)

( * ) Notice: Subject to any disclaimer, the term of this patent is extended or adjusted under 35 U.S.C. 154(b) by 0 days.

(21) Appl. No.: 13/660,892

(22) Filed: Oct. 25, 2012

(65) Prior Publication Data

US 2013/0113180 A1 May 9, 2013

Related U.S. Application Data

(60) Provisional application No. 61/551,331, filed on Oct. 25, 2011.

(51) Int. Cl.
| | | |
|---|---|---|
| *B60D 1/52* | (2006.01) | |
| *B60D 1/06* | (2006.01) | |
| *B60D 1/48* | (2006.01) | |

(52) U.S. Cl.
CPC ............... *B60D 1/52* (2013.01); *B60D 1/06* (2013.01); *B60D 1/488* (2013.01)

(58) Field of Classification Search
CPC .......... B60D 1/06; B60D 1/065; B60D 1/485; B60D 1/488

USPC ................. 280/495, 496, 497, 511
See application file for complete search history.

(56) References Cited

U.S. PATENT DOCUMENTS

| | | | | |
|---|---|---|---|---|
| 5,143,393 | A * | 9/1992 | Meyer ................. | B60D 1/52 280/433 |
| 5,246,244 | A * | 9/1993 | Colibert ............. | 280/495 |
| D362,224 | S | 9/1995 | McCoy et al. | |
| 5,472,222 | A * | 12/1995 | Marcy ................. | B60D 1/52 280/433 |
| 5,509,682 | A | 4/1996 | Lindenman et al. | |
| 5,516,137 | A | 5/1996 | Kass et al. | |
| 5,529,329 | A | 6/1996 | McCoy | |
| D378,077 | S | 2/1997 | Lindenman et al. | |
| 5,707,070 | A | 1/1998 | Lindenman et al. | |
| 5,971,418 | A | 10/1999 | Lindenman et al. | |
| 6,065,766 | A | 5/2000 | Pulliam | |
| 6,199,890 | B1 * | 3/2001 | Lindenman et al. ...... | 280/491.1 |
| 6,409,202 | B1 * | 6/2002 | Putnam ............. | B60D 1/06 280/495 |
| 6,520,528 | B2 | 2/2003 | Fandrich et al. | |
| 6,616,168 | B2 | 9/2003 | Belinky | |
| 6,695,338 | B1 * | 2/2004 | Roberts ............. | B60D 1/06 280/491.5 |

(Continued)

*Primary Examiner* — Kevin Hurley
*Assistant Examiner* — Marlon A Arce
(74) *Attorney, Agent, or Firm* — McDonald Hopkins LLC

(57) ABSTRACT

A gooseneck hitch attachable to a cross member secured to a frame below a load bed of a vehicle, the cross member having a width is shown and described. The gooseneck hitch may include a beam selectively attachable to the cross member below the load bed and a rail monolithically formed with the beam and extending from the beam. The gooseneck hitch may also include a receptacle monolithically formed with the rail, where the receptacle is capable of selectively securing a hitch ball.

23 Claims, 13 Drawing Sheets

(56) References Cited

U.S. PATENT DOCUMENTS

| | | | |
|---|---|---|---|
| 6,783,144 B2 | 8/2004 | McCoy et al. | |
| 6,969,090 B1* | 11/2005 | Works | B60D 1/06 280/407 |
| 7,121,573 B2 | 10/2006 | Lindenman et al. | |
| 7,264,259 B2 | 9/2007 | Lindenman et al. | |
| 7,793,968 B1 | 9/2010 | Withers | |
| 7,828,317 B2 | 11/2010 | Withers et al. | |
| 7,918,476 B1* | 4/2011 | Linger | 280/511 |
| 8,011,685 B2 | 9/2011 | Belinky et al. | |
| 8,414,009 B2* | 4/2013 | Stanifer | B60D 1/02 280/433 |
| 2003/0015855 A1 | 1/2003 | McCoy et al. | |
| 2003/0038452 A1 | 2/2003 | Lindenman et al. | |
| 2003/0209878 A1 | 11/2003 | Lindenman et al. | |
| 2003/0209879 A1 | 11/2003 | Lindenman et al. | |
| 2009/0224511 A1* | 9/2009 | Dick | 280/511 |
| 2012/0126509 A1* | 5/2012 | Erickson | 280/441.2 |

* cited by examiner

INTEGRALLY FORMED GOOSENECK HITCH ASSEMBLY

CROSS-REFERENCE TO RELATED APPLICATION

This application claims the benefit from U.S. Provisional Patent Application No. 61/551,331 entitled "Integrally Formed Gooseneck Hitch Assembly" filed on Oct. 25, 2011, which is hereby incorporated in its entirety by reference.

FIELD OF INVENTION

The present invention relates generally to a gooseneck hitch and, more particularly, to an integrally formed gooseneck hitch.

BACKGROUND

Many vehicles are designed to transport freight, goods, merchandise, personal property, and other large cargo. Often, these vehicles are arranged to tow a towed vehicle, such as for example a trailer, by attaching the towed vehicle to the towing vehicle, such as through the use of some kind of hitch assembly. The towing industry has developed a number of methods and apparatuses for securing or engaging the towed vehicle to the towing vehicle, such as attaching a trailer to a pick-up truck.

There are many different types of trailer hitches in the art attached to the towing vehicle in a variety of ways depending on the type of towed vehicle and towing vehicle involved. Some of the most common types of hitches include gooseneck, fifth wheel, and rear mounted hitches. For example, towed vehicles may be connected to the towing vehicle by way of a hitch assembly that includes a hitch ball or member secured to the towing vehicle and a ball socket coupling mechanism on the towed vehicle that mounts over the hitch ball. This allows for the towed vehicle to pivot behind the towing vehicle.

Numerous types of hitch balls have been developed to be attached to the bumper or other rear portion of a towing vehicle. The towed vehicle may be equipped with a coupler mechanism that is attached to the towing vehicle by placing the coupler mechanism over the hitch ball and securing the coupler to the hitch ball. Similar apparatus using hitch receivers attached to the rear of the towing vehicle and drawbars may be used to secure towed vehicles to towing vehicles.

Some towed vehicles may be designed to carry heavy loads. Connecting such a towed vehicle to a ball hitch on a bumper of a towing vehicle, however, may be impractical. When a towed vehicle load is heavy as compared to the weight of the towing vehicle, applying the towed vehicle load over or near the rear axle of the towing vehicle may create a more desirable towing condition. In addition, such an arrangement may put much of the force of the towed vehicle load onto structural members of the towing vehicle, such as the frame. This may result in the hitch ball being located in the truck bed.

There are generally two arrangements for securing a towed vehicle to the bed of a towing vehicle—a fifth wheel hitch and a gooseneck hitch. A fifth wheel hitch may be utilized with towed vehicles having a king pin, which may be part of a pin box attached to the towed vehicle. Fifth wheel hitches may generally be attached in a bed of a truck or directly to the frame of the truck in a more permanent manner. Tools, however, may generally be required to remove fasteners and other connectors to install or uninstall a fifth wheel hitch to the bed of a towing vehicle. A gooseneck hitch may be utilized with a towed vehicle having a gooseneck coupler generally coupled to a hitch ball that may be located in the bed of the towing vehicle. The hitch ball may be permanently or removably secured to the frame or bed of the towing vehicle.

The towed vehicle coupler often has a socket portion sized and shaped to receive the hitch ball. The gooseneck coupler may engage the hitch ball to pivotally couple the towed vehicle to the towing vehicle. The gooseneck coupler to hitch ball connection may allow for relative movement between the towing vehicle and the towed vehicle as the towing vehicle makes turns, transverses uneven or rough terrain, and passes along inclining and declining roadways.

The hitch ball may be selectively secured to a gooseneck hitch generally attached below the towing vehicle's load bed to the frame of the towing vehicle. This may allow the hitch ball to be removed when not in use, which results in the load bed being capable of being utilized without obstruction. There is not a lot of available room below the load bed of the vehicle. Accordingly, there is a need for a gooseneck hitch that is capable of having a structure and a shape that may be capable of attaching below the load bed.

Due to the significant forces that may be applied to the gooseneck hitch, such gooseneck hitches are most often fabricated from heavy metal pieces that are welded together to form the gooseneck hitch. However, fabricating the gooseneck hitch in this manner may limit the potential shape of the gooseneck hitch. Still further, fabricating a gooseneck hitch in this matter results in the gooseneck hitch being very heavy and large, this may make it difficult to attach to the vehicle.

Therefore, there is a need for a gooseneck hitch that may be of any appropriate shape and size that it fits appropriately on the frame of the towing vehicle below the bed thereof. Further, there is a need for a gooseneck hitch that is attachable to the towing vehicle in an efficient and effective manner. Still further, there is a need for a gooseneck hitch that may be capable of withstanding the significant forces that may be applied to it during operation.

SUMMARY

A gooseneck hitch attachable to a cross member secured to a frame below a load bed of a vehicle, the cross member having a width is shown and described. The gooseneck hitch may include a beam selectively attachable to the cross member below the load bed and a rail monolithically formed with the beam and extending from the beam. The gooseneck hitch may also include a receptacle monolithically formed with the rail, where the receptacle is capable of selectively securing a hitch ball.

A gooseneck hitch attachable to a cross member secured to a frame below a load bed of a vehicle, the cross member having a width, whereby the gooseneck hitch may include first and second beams transversely spaced from one another and selectively attachable to the cross member, where the first and second beams have a beam width less than the width of the cross member. The gooseneck hitch may also include first and second rails attached with and extending from the first and second beams and a receptacle attached with the first and second rails, where the receptacle is capable of selectively securing a hitch ball and where attachment of the first and second beams with the first and second rails is weld free.

A towing vehicle may include a load bed, a frame positioned below the load bed, a cross member attached to the frame and positioned below the load bed, the cross member having a perimeter and an underside, and a gooseneck hitch attached to the cross member below the load bed. The gooseneck hitch may include at least one beam attached to the cross member, the at least one beam positioned in proximity to the underside of the cross member, at least one rail monolithically formed with the at least one beam and extending from the at least one beam, and a receptacle monolithically formed with the at least one rail, where the receptacle is capable of selectively securing a hitch ball.

DESCRIPTION OF THE DRAWINGS

Operation of the invention may be better understood by reference to the following detailed description taken in connection with the following illustrations, wherein.

DETAILED DESCRIPTION

Figure 1:
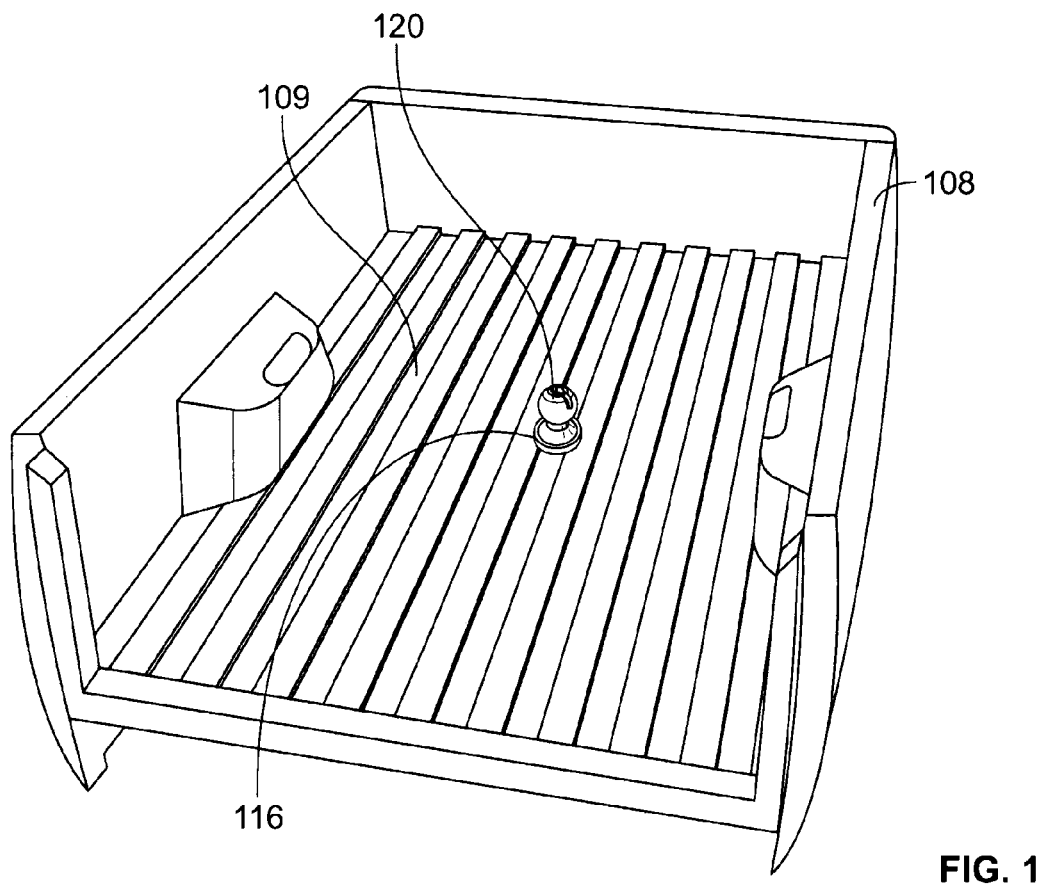
FIG. 1 is a rear perspective view of a towing vehicle having a gooseneck hitch attached to a frame of the towing vehicle below the load bed of the towing vehicle with a hitch ball attached.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A gooseneck hitch 100 is shown in FIGS. 1, 3-18. The gooseneck hitch 100 may be capable of attaching to a frame 107 of a towing vehicle 108. The gooseneck hitch 100 may be located under a load bed 109 of the towing vehicle 108 and attached to the frame 107 of the towing vehicle 108. The gooseneck hitch 100 may be a single monolithic unit, i.e., integrally formed from a single unitary member. In some embodiments, the monolithic gooseneck hitch 100 may be formed through casting or any other appropriate forming process. By way of a non-limiting example, casting the gooseneck hitch 100 may provide the appropriate configuration to fit under the load bed 109 of the towing vehicle 108. Further still, the gooseneck hitch 100 may be configured to withstand all loads applied during operation of towing of the towed vehicle.

The gooseneck hitch 100 may be selectively attached to the frame 107 of the towing vehicle 108 in any appropriate manner. The towing vehicle 108 may include a cross member 110 that may be attached to the frame 107 of the towing vehicle 108 in any appropriate manner. The cross member 110 may be attached the frame 107 of the towing vehicle 108 such that it is immediately below the load bed 109 of the towing vehicle 108, or may form a portion of the load bed 109 of the towing vehicle 108. In such embodiments, the cross member 110 may include an aperture 115 formed therein. The aperture 115 may be formed in any appropriate manner, such as being integrally formed contemporaneously with the cross member 110 or formed through a subsequent operation, such as drilling, punching or the like. The aperture 115 may be of a shape and size that a hitch ball 120, which may be attached to the gooseneck hitch 100 as described in more detail below, may extend through the aperture 115 and into the load bed 109 of the towing vehicle 108. The hitch ball 120 may extend through the load bed 109 of the towing vehicle 108 through an aperture therein 116. A gooseneck coupler of a towed vehicle of any appropriate configuration may then be selectively attached to the hitch ball 120.

Figure 4:
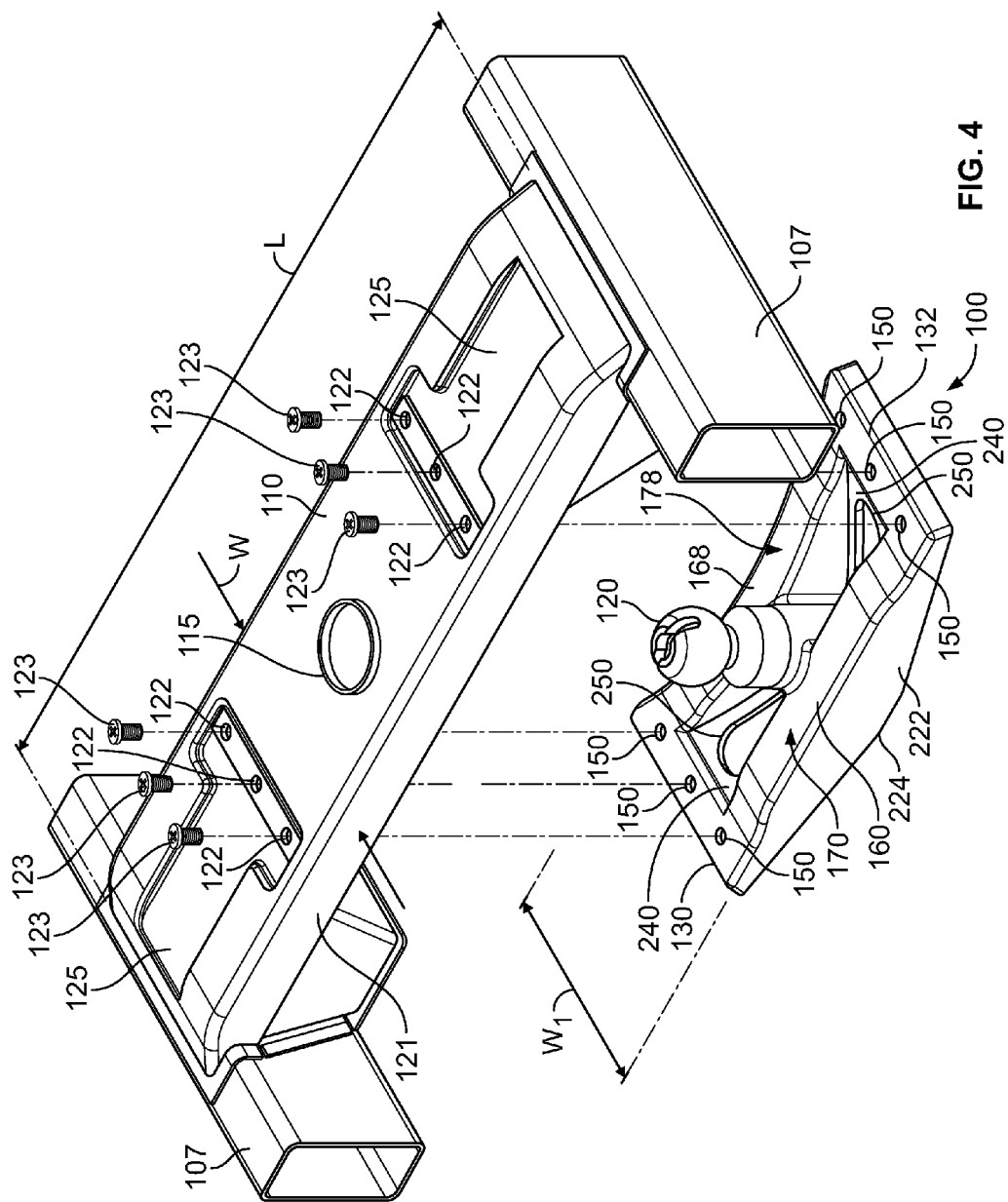
FIG. 4 is a perspective view of a gooseneck hitch being attached to a cross member attached to a frame of a towing vehicle.
Figure 5:
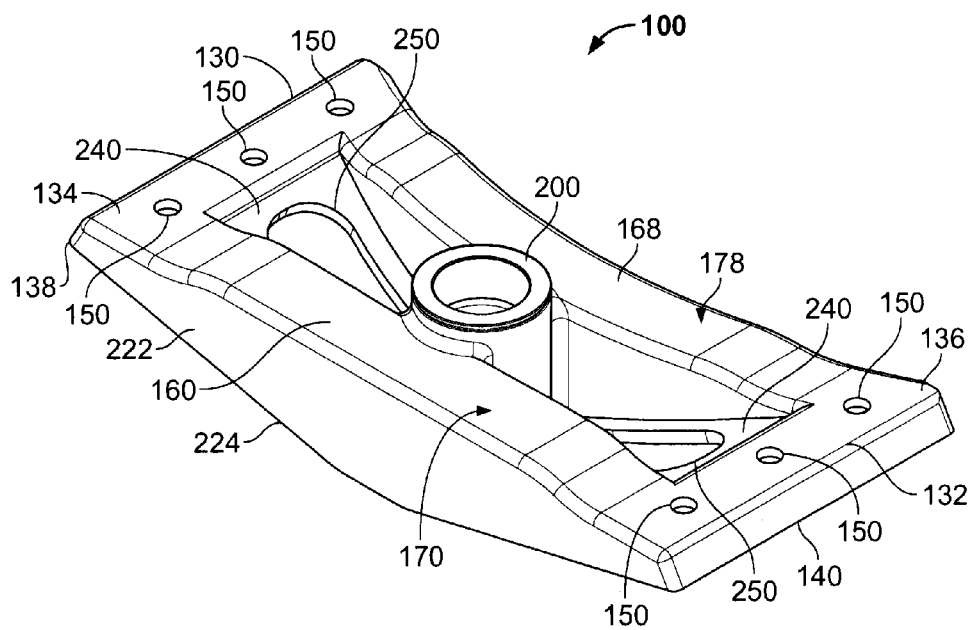
FIG. 5 is a perspective view of a gooseneck hitch.
Figure 6:
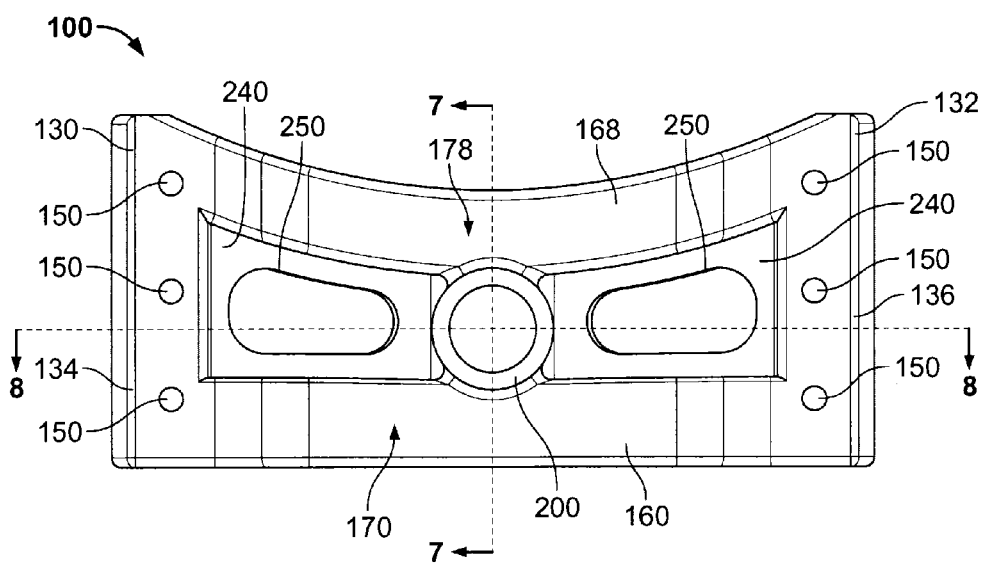
FIG. 6 is a plan view of a gooseneck hitch.

The cross member 110 may be attached the frame 107 of the towing vehicle 108 in any appropriate manner, including, without limitation, through use of fasteners, welding, adhering, or being integrally formed as a single monolithic unit. The cross member 110 may include a width W, such as shown in FIG. 4. At each side of the cross member 110 a generally downward extending portion such as a skirt 121 may be attached through any appropriate process. The skirt 121 may extend an entire length L of the cross member 110 between the frame 107 or may extend only a portion of the length L. In some embodiments, the length L may be less than or substantially equivalent to the total width of the load bed 109 of the towing vehicle 108.

Figure 2:
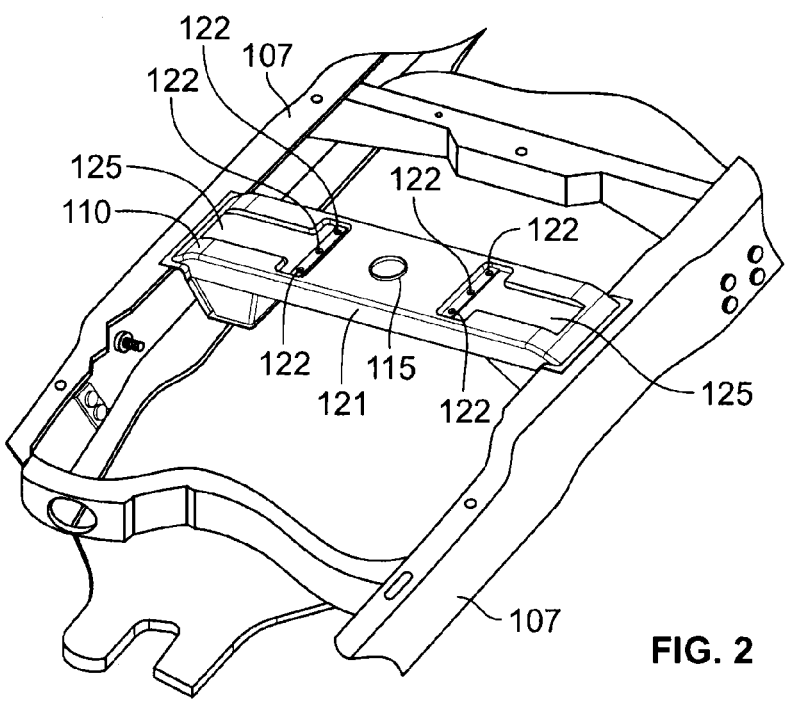
FIG. 2 is a rear perspective view of a towing vehicle with a cross member attached to a frame of the towing vehicle.
Figure 3:
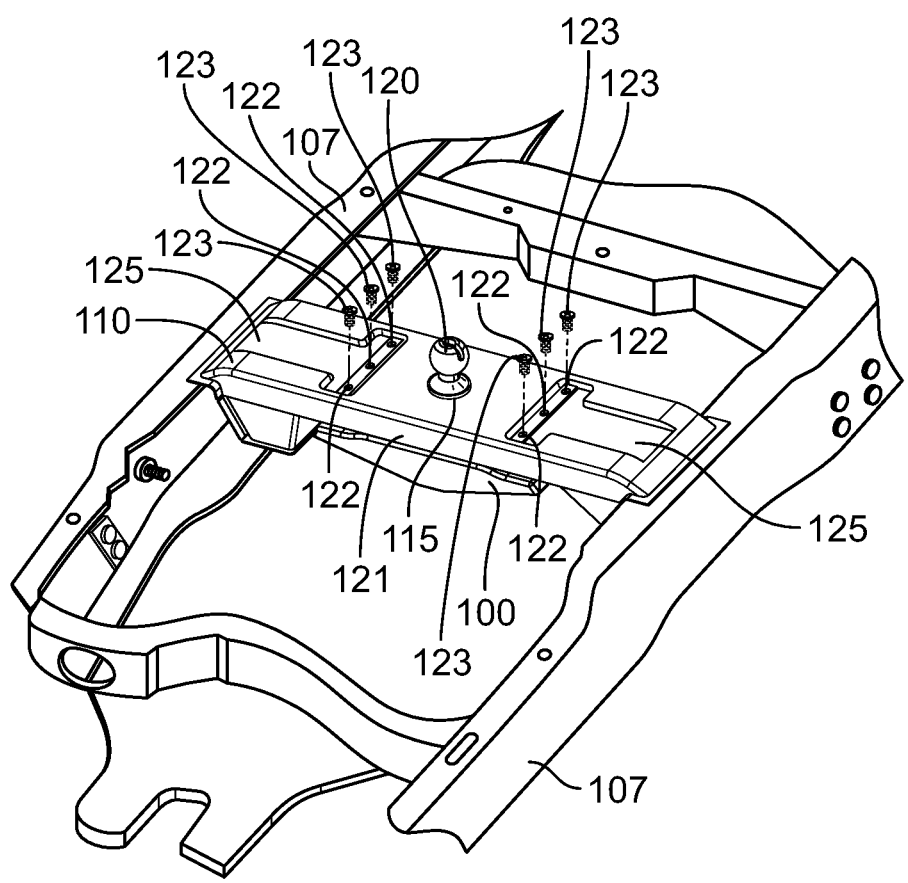
FIG. 3 is a rear perspective view of a towing vehicle with a cross member attached to a frame of the towing vehicle and a gooseneck hitch attached to the cross member.

The cross member 110 may include a plurality of apertures 122 extending therethrough. The cross member 110 may include two sets of plurality of apertures 122 that may each be laterally spaced from the aperture 115 on each side of the cross member 110, such as three apertures 122 as shown in FIGS. 2-4. Any appropriate number of apertures 122, including, without limitation one, two, three, four, five, etc. of such apertures 122 and any appropriate configuration of apertures 122 may be used without departing from the present teachings. The apertures 122 may be of any appropriate shape and size such that a fastener 1230 may be capable of being inserted into the apertures 122 and secured therein. The cross member 110 may further include a pair of recesses 125 formed therein. The recesses 125 may be utilized to reduce material and to assist with fitting the cross member 110 under the load bed 109 of the towing vehicle 108. Specifically, the recess 125 may be shaped and sized to mount the fasteners 123 generally flush with a top portion of the cross member 110 and clear the bottom of the load bed 109. A set of apertures 122 may be positioned in each of the recesses 125 such as shown in FIGS. 2-4. FIGS. 2-4.

The gooseneck hitch 100 may include first and second beams 130, 132. The first and second beams 130, 132 may be laterally disposed from one other. The may result in the first and second beams 130, 132 being located on opposite sides of the gooseneck hitch 100. The first and second beams 130, 132 may be generally mirror images of one another, or may be generally different from one another. The first and second beams 130, 132 may extend an entire width $W_1$ of the gooseneck hitch 100.

Figure 13:
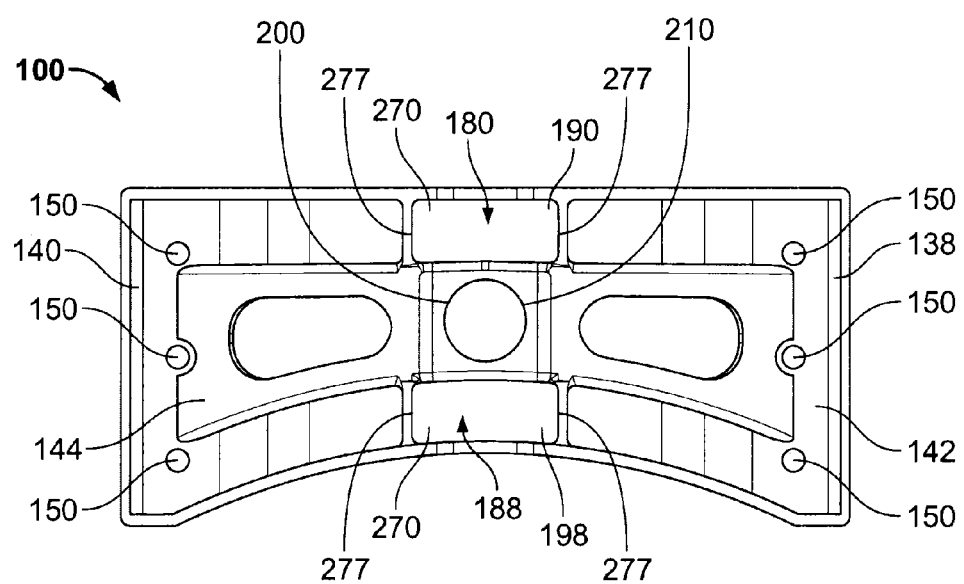
FIG. 13 is a bottom view of a gooseneck hitch.
Figure 16:
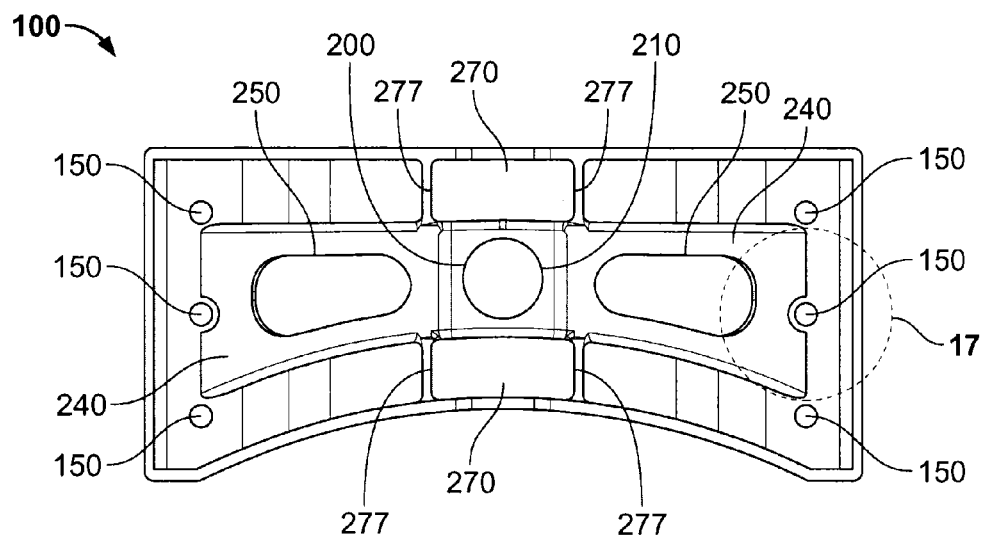
FIG. 16 is a bottom view of a gooseneck hitch.
Figure 17:
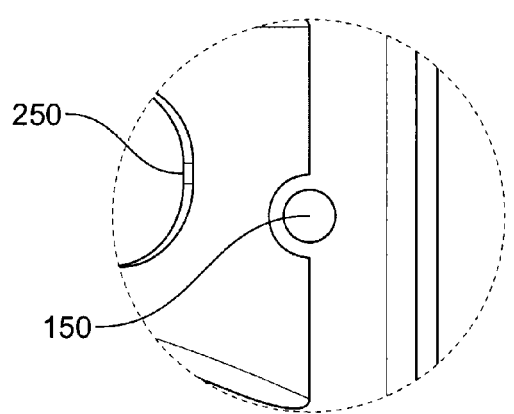
FIG. 17 is an exploded view of the gooseneck hitch of FIG. 16 at 17.
Figure 18:
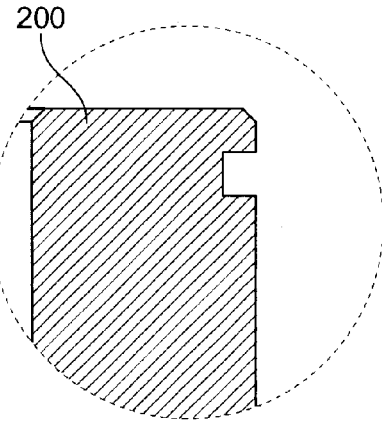
FIG. 18 is an exploded view of a portion of a receptacle of a gooseneck hitch.

The first and second beams 130, 132 may include top portions 134, 136 and bottom portions 138, 140, respectively. The top portions 134, 136 may be generally flat such that they are each capable of nestingly fitting either adjacent to or in relatively close proximity to the underside of the cross member 110. While the top surfaces 134, 136 are shown as being generally flat, they may be of any appropriate shape such that they nestingly fit within the underside of the cross member 110. The bottom portions 138,140 of the first and second beams 130, 132 may have an open cavity 142, 144 such that there may be no generally hollow portion, an example of which is shown in FIGS. 13 and 16.

The first and second beams 130, 132 may each include a plurality of apertures 150, which may extend from the top surfaces 134, 136 to the bottom surfaces 138, 140. The apertures 150 may be positioned predetermined distances from one another. In such embodiments, the apertures 150 may generally align with the apertures 122 in the cross member 110. The apertures 150 of the first and second beam structures 130, 132 may be shaped and sized to accept the fastener 123 such that the gooseneck hitch 100 may be selectively attached to cross member 110 secured to the frame 107 of the towing vehicle 108. While the first and second beams 130, 132 may be shown with three such apertures 150, it should be understood that any number of such apertures may be used without departing from the present teachings, including, without limitation one, two, three, four, five, etc. of such apertures.

The gooseneck hitch 100 may include first and second generally transverse rail portions 160, 168, respectively, that may be attached to the first and second beams 130, 132 in any appropriate manner. By way of a non-limiting example, the first and second rail portions 160, 168 may be integrally formed with the first and second beams 130, 132 as a monolithic unit. In some embodiments, the first and second rail portions 160, 168 may be attached to the first and second beams 130, 132 through casting the entire gooseneck hitch 100.

The first generally transverse rail section 160 may be generally rectangular in shape as shown. The second generally transverse rail section 168 may have a generally curved shaped as shown. The second generally transverse rail section 168 may be positioned proximally to the rear of the towing vehicle 108. In a non-limiting example, the second generally transverse rail section 168 may be curved to account for the position of the apertures 150 so that they may be positioned to generally align with the corresponding apertures 122 in the cross member 110. The cross member 110 may be attached to the frame 107 of the vehicle, which limits the available space for the gooseneck hitch 100. Accordingly, the curve of the second generally transverse rail section 168 may prevent having to add more material to the gooseneck hitch 100 to appropriately position the apertures 150. This may reduce the overall weight of the gooseneck hitch 100. Further, the curve of the second generally transverse rail section 168 may create additional space for the gooseneck hitch 100 to be secured under the towing vehicle 108.

While the generally rectangular and curved shapes are shown, the first and second generally transverse rail section 160, 168 may be of any appropriate shape. In some embodiments, the position of the apertures 150 may be such that the first generally transverse rail section 160 may be curved and the second generally transverse rail section 168 may be generally rectangular. Further, the first and second generally transverse rail section 160, 168 may be generally curved. Further still, the first and second generally transverse rail sections 160, 168 may be generally rectangular. The present teachings are not limited to a particular shape and the first and second generally transverse rail sections 160, 168 may be of any appropriate shape.

The first and second generally transverse rail sections 160, 168 may include upper surfaces 170, 178 and bottom surfaces 180, 188. The upper surfaces 170, 178 may be generally flat. The generally flat upper surfaces 170, 178 may be shaped to nestingly fit the gooseneck hitch 100 adjacent to or in close proximity to the underside of the cross member 110. The bottom surfaces 180, 188 may have an open cavity 190, 198 such that there may be no generally hollow portion.

The gooseneck hitch 100 may include a receptacle 200 that may be attached to the first and second generally transverse rail sections 160, 168. The receptacle 200 may be integrally formed with the first and second generally transverse rail sections 160, 168 as a monolithic unit, such as by way of a non-limiting example, being cast therewith. The receptacle 200 may be capable of accepting and having selectively secured thereto the gooseneck hitch ball 120. The gooseneck hitch ball 120 may be of any appropriate shape and size. The receptacle 200 may include a groove 202 that may be generally positioned radially around the periphery of the diameter of the receptacle 200. The groove 202 may be shaped and sized to engaging a locking mechanism (not shown) of the hitch ball 120, an example of which is shown and described in U.S. Pat. Nos. 8,011,685 and 6,616,168, both of which are hereby incorporated by reference.

The receptacle 200 may be positioned on the gooseneck hitch 100 such that when the gooseneck hitch 100 is selectively attached to the cross member 110, the receptacle 200 is generally aligned with the aperture 115 of the cross member 110. Further, the receptacle 200 may be positioned immediately below, immediately above, or generally planar with the cross member 110 or the load bed 109 of the towing vehicle 108 upon attachment of the gooseneck hitch 100 with the cross member 110.

The receptacle 200 may include a bottom portion 210 that may be generally flat surface 212. The generally flat surface 212 may provide room for the gooseneck coupler 100 to fit under the load bed 109 of the towing vehicle 108. Further, the configuration of the generally flat surface 212 may prevent the gooseneck hitch 100 from interfering with the axle of the towing vehicle 108. The profile of the gooseneck hitch 100 may be such that it is capable of efficiently and effectively fitting below the load bed 109 of the towing vehicle 108.

Figure 7:
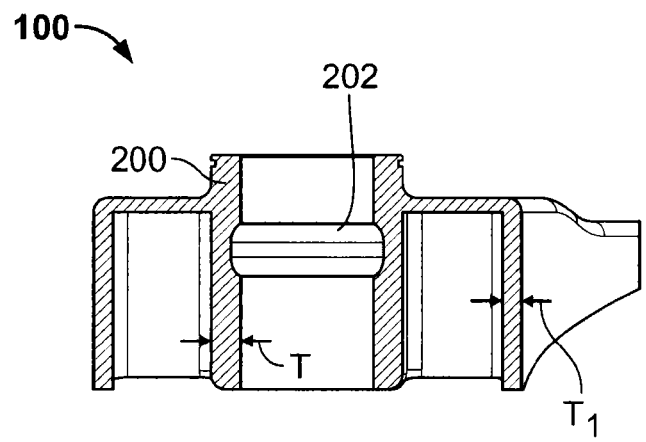
FIG. 7 is a cross sectional view of the gooseneck hitch of FIG. 6 along line 7-7.
Figure 8:
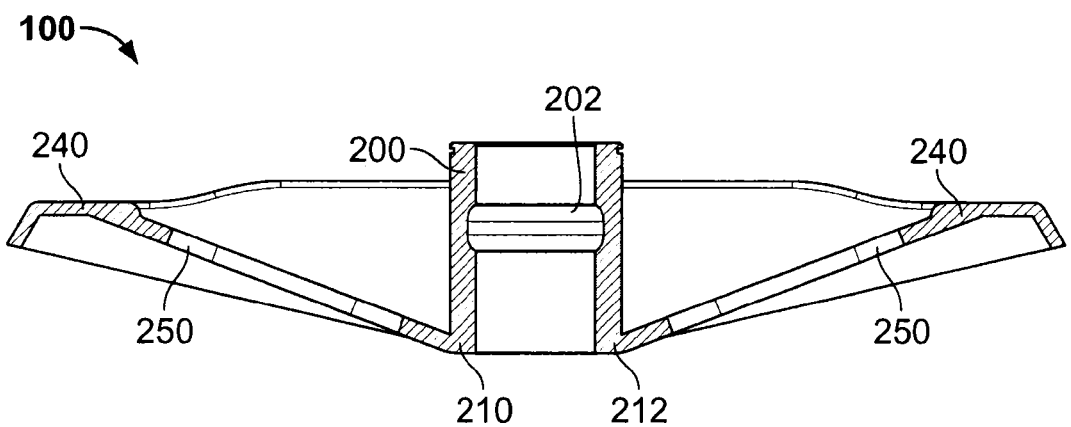
FIG. 8 is a cross sectional view of the gooseneck hitch of FIG. 6 along line 8-8.
Figure 9:
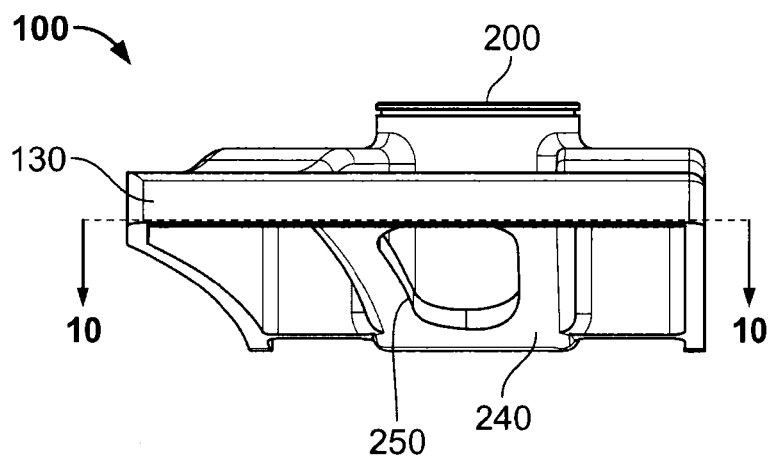
FIG. 9 is a side view of a gooseneck hitch.
Figure 10:
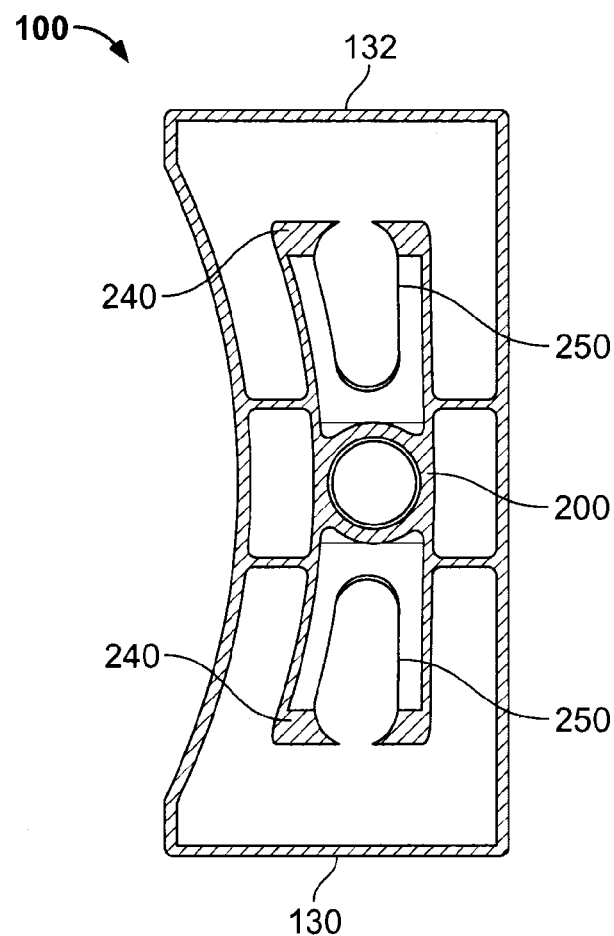
FIG. 10 is a cross sectional view of the gooseneck hitch of FIG. 9 along line 10-10.
Figure 11:
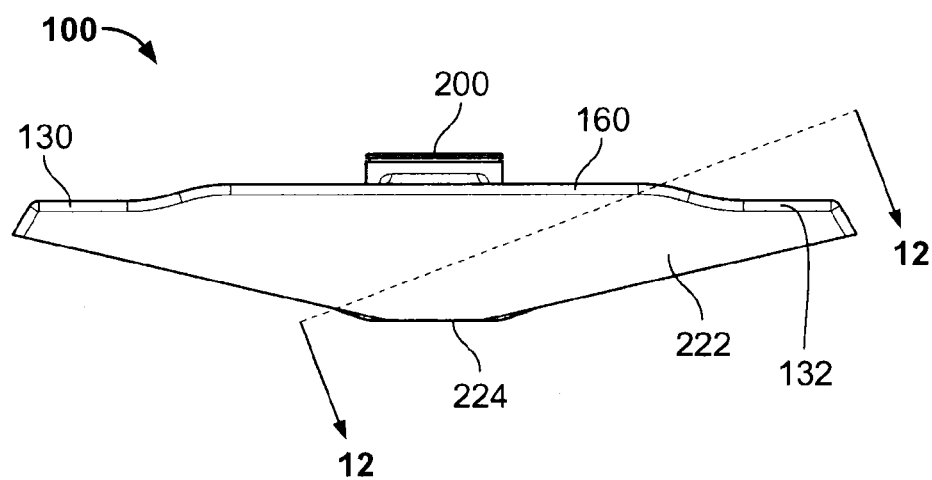
FIG. 11 is a front view of a gooseneck hitch.
Figure 12:
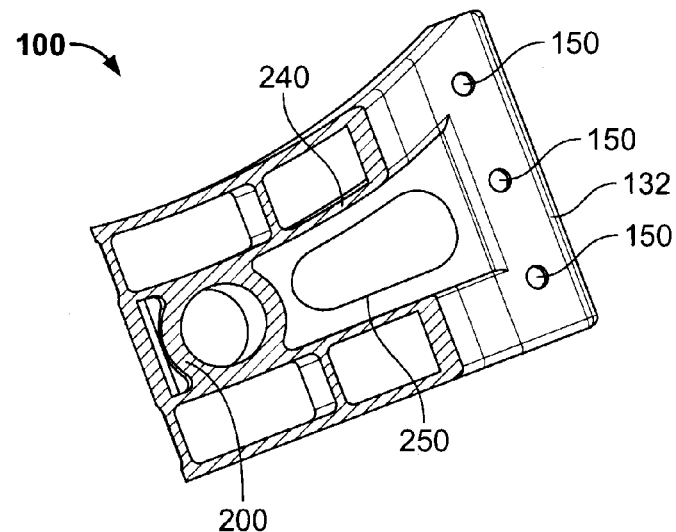
FIG. 12 is a cross sectional view of the gooseneck hitch of FIG. 11 along line 12-12.
Figure 15:
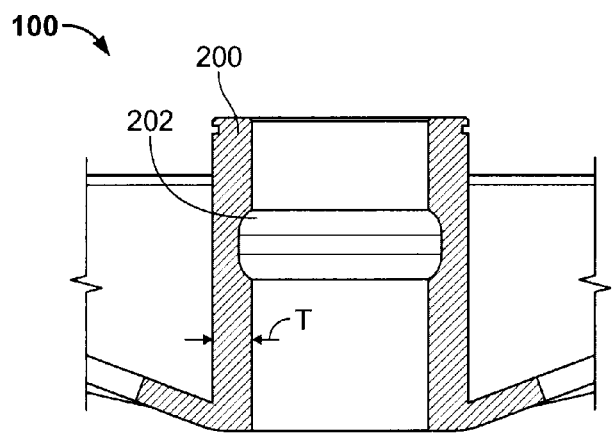
FIG. 15 is a partial cross sectional view of the gooseneck hitch of FIG. 14 along line 15-15.

In some embodiments, an example of which is shown in FIGS. 7 and 15, the receptacle 200 may have a thickness T that may be generally greater than a thickness $T_1$ of the other components of the gooseneck hitch 100, such as the first and second beam 130, 134 and the first and second rails 160, 168. Further, the towing load applied to the gooseneck hitch 100 enters at the receptacle 200 and as the thickness T is greater than $T_1$, the gooseneck hitch 100 may be capable of operating under greater loads.

The gooseneck hitch 100 may include a pair of side curtains 222 that may be attached to and may extend from each of the first and second generally transverse rail sections 160, 168. The side curtains 222 may be integrally formed with the first and second generally transverse rail sections 160, 168 as a monolithic unit, such as by way of a non-limiting example being cast therewith. The side curtains 222 may each include bottom portions 224 that may be generally flat. The bottom portions 224 of the side curtains 222 may generally be coterminous with the receptacle 200 and more specifically with the flat surface 212 of the bottom surface 210 of the receptacle 200.

The gooseneck hitch 100 may include web portions 240 that may be generally positioned between and attached to the first and second beam sections 130, 134, the first and second generally transverse rail sections 160, 168, and the receptacle 200. The web portions 240 may be integrally formed with the first and second beam sections 130, 134, the first and second generally transverse rail sections 160, 168 and the receptacle 200 as a monolithic unit, such as by way of a non-limiting example being cast therewith. The web portions 240 may be provided to add strength to the gooseneck hitch 100. The web portions 240 may generally reduce the stress that may be applied during use of the gooseneck hitch 100. Further, the web portions 240 may provide that T of the receptacle 200 is greater than $T_1$, which may allow greater loads to be applied in the operative condition.

The web portions 240 may each include an opening 250. The openings 250 may be of any appropriate shape and size. By way of a non-limiting example and as shown in FIGS. 4-6, 9-10, 12-14 and 16 the openings 250 may be of a generally kidney shape. However, the openings 250 may be generally circular, rectangular, oval, square, polygonal, or any other appropriate shape and size—the present teachings are not limited to a specific configuration. The openings 250 may be provided to reduce the overall weight of the gooseneck hitch 100 while maintaining the strength thereof. The openings 250 may be formed in the web portions 240 in any appropriate manner. By way of a no-limiting example, the openings 250 may be formed when the web portions 240 are cast.

The gooseneck hitch may include a plurality of ribs 277 of any appropriate shape and size that may be positioned on an underside 270 of the gooseneck hitch 100. The ribs 277 may be located at any appropriate position. The ribs 277 may provide additional strength to the gooseneck hitch 100.

The gooseneck hitch 100 may be formed as a single unitary member—i.e., a monolithic unit—such as by way of a non-limiting example, being casted, forged, hydro-formed or the like. Once formed, the gooseneck hitch 100 may be heat treated to any appropriate strength and hardness, especially after casting thereof. The gooseneck hitch 100 may be free of having any components welded thereto, which may result in the gooseneck hitch 100 being generally weld free. In addition, the gooseneck hitch 100 may avoid the use or include any enclosed cavities as many of the prior art gooseneck hitches do. This may lead to an overall weight reduction of the gooseneck hitch 100 while maintaining or potentially improving the rating and towing capabilities of the gooseneck hitch 100.

Figure 14:
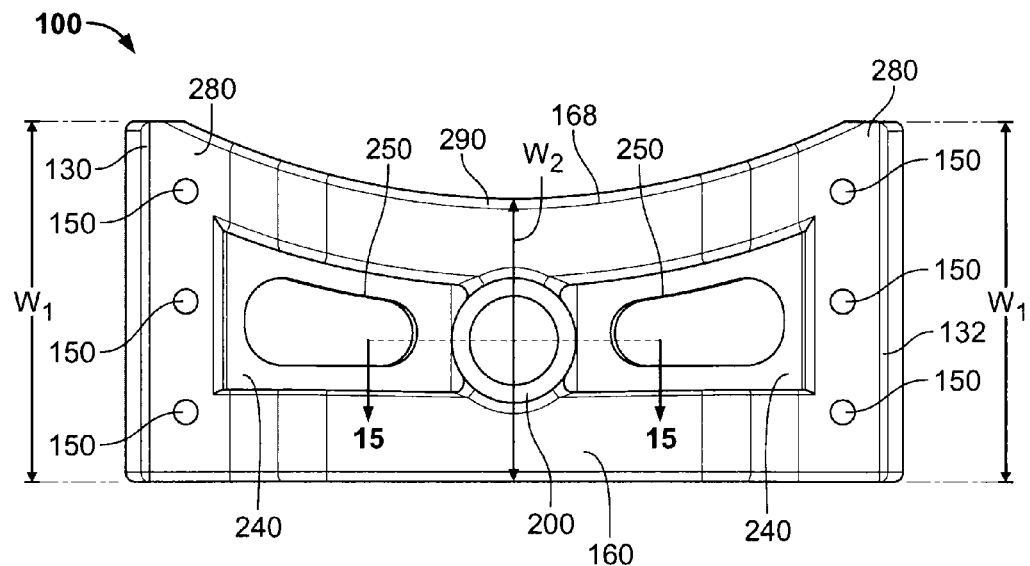
FIG. 14 is a top view of a gooseneck hitch.

Further, the shape of the gooseneck hitch 100 may be such that it may generally fit under the load bed 109 of the towing vehicle 108 within the frame 107 and axle thereof. As shown in FIGS. 4 and 14, a width $W_1$ of ends 280 of the gooseneck hitch 100 may be generally greater than the width $W_2$ of a center portion 290 of the gooseneck hitch 100. This may result in the gooseneck hitch 100 being generally lighter than prior art gooseneck hitches and may be capable of handling greater loads.

The gooseneck hitch 100 when attached with the towing vehicle 108, or more specifically, when attached to the cross member 110 may be positioned within the skirt 121 of the cross member 110. This may result in the gooseneck hitch 100 fitting within a compact area below the load bed 109 of the towing vehicle 108. Specifically, the width $W_1$ of the first and second beams 130, 132 of the gooseneck hitch 100 may be less than the width W of the cross member 110. Therefore, the entire profile of the gooseneck hitch 100, i.e., the first and second beams 130, 132 along with the first and second generally transverse rail sections 160, 168, may fit entirely below the cross member 110 and between the skirt 121 of the cross member 100. This permits the gooseneck hitch 100 to be operatively positioned relative to the towing vehicle 108 such that it is not in the way or otherwise does not interfere with the other components of the towing vehicle 108. In some embodiments, no portion of the gooseneck hitch 100 may extend beyond the skirt 121 of the cross member 110, or stated differently extend beyond the width W of the cross member 110.

Additional embodiments of a gooseneck hitch according the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired gooseneck hitch without departing from the spirit and scope of the present invention.

In some embodiments, at least one of the beam members may include a generally indented surface that may surround one of the apertures. In these embodiments, the indentation may be of a general shape and size to position a clip therein. The clip may be used to temporarily secure the gooseneck hitch to the cross member. The clip may hold the gooseneck coupler in the appropriate position. The fasteners may then be used to removably secure the gooseneck coupler assembly with the cross member.

A gooseneck hitch 300 is shown in FIGS. 19-26. The gooseneck hitch 300 may be capable of attaching to the frame 107 of the towing vehicle 108, such as described above. The gooseneck hitch 300 may be located under the load bed 109 of the towing vehicle 108 and attached to the frame 107 of the towing vehicle 108. The gooseneck hitch 300 may be a single monolithic unit, i.e., integrally formed from a single unitary member. In some embodiments, the monolithic gooseneck hitch 300 may be formed through casting or any other appropriate forming process. By way of a non-limiting example, casting the gooseneck hitch 300 may provide the appropriate configuration to fit under the load bed 109 of the towing vehicle 108. Further still, the gooseneck hitch 300 may be configured to withstand all loads applied during operation of towing of the towed vehicle.

The gooseneck hitch 300 may be selectively attached to the frame 107 of the towing vehicle 108 in any appropriate manner. The towing vehicle 108 may include a cross member 310 that may be attached to the frame 107 of the towing vehicle 108 in any appropriate manner. The cross member 310 may be attached the frame 107 of the towing vehicle 108 such that it is immediately below the load bed 109 of the towing vehicle 108, or may form a portion of the load bed 109 of the towing vehicle 108. In such embodiments, the cross member 310 may include an aperture 315 formed therein. The aperture 315 may be formed in any appropriate manner, such as being integrally formed contemporaneously with the cross member 310 or formed through a subsequent operation, such as drilling, punching or the like. The aperture 315 may be of a shape and size that a hitch ball 120, which may be attached to the gooseneck hitch 300 as described in more detail above.

Figure 19:
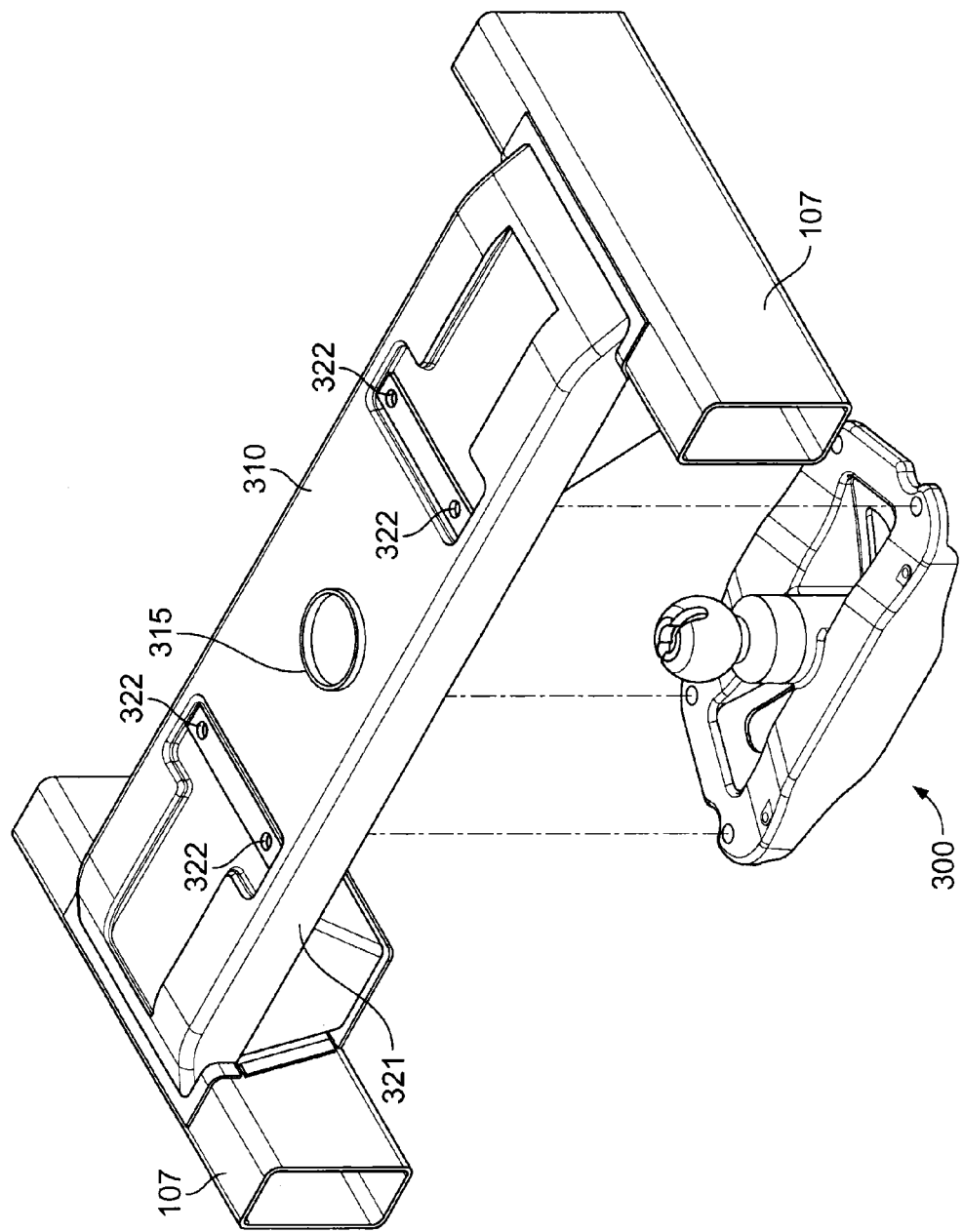
FIG. 19 is a perspective view of a gooseneck hitch being attached to a cross member attached to a frame of a towing vehicle.
Figure 20:
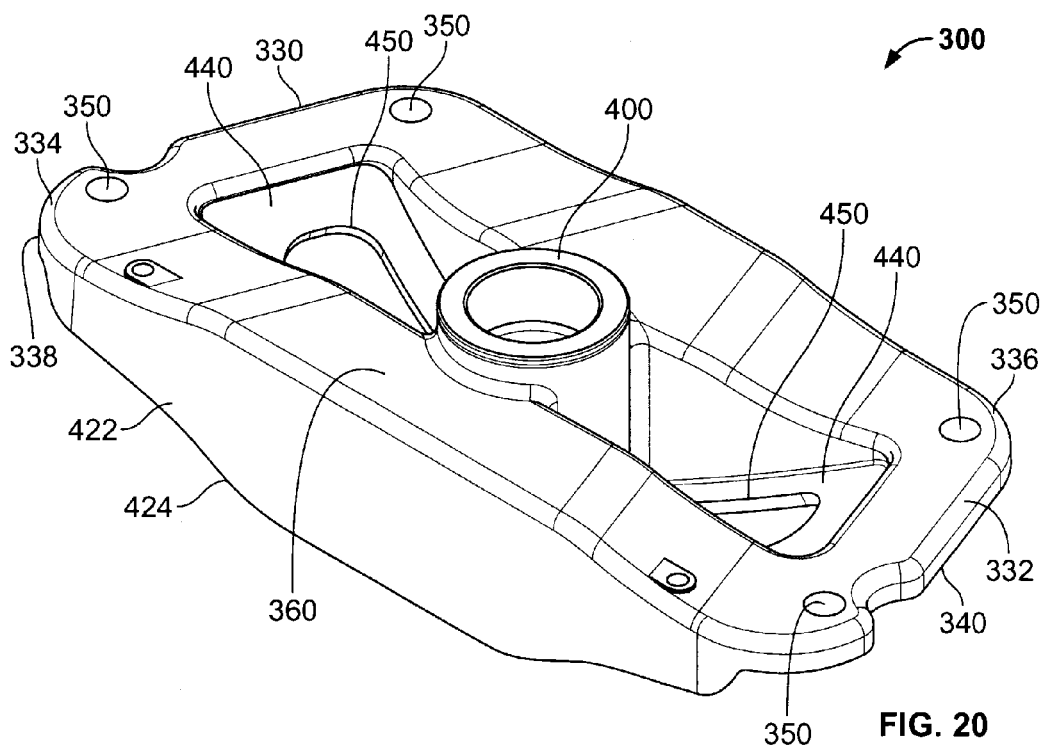
FIG. 20 is a perspective view of a gooseneck hitch.
Figure 21:
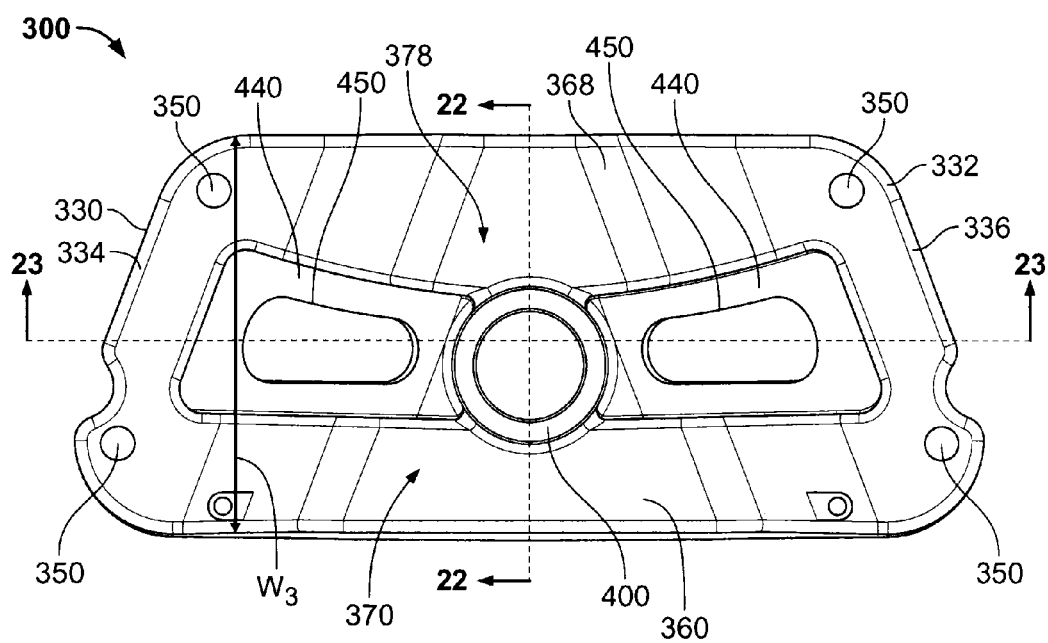
FIG. 21 is a plan view of a gooseneck hitch.

The cross member 310 may be attached the frame 107 of the towing vehicle 108 in any appropriate manner, including, without limitation, through use of fasteners, welding, adhering, or being integrally formed as a single monolithic unit. The cross member 310 may include a width $W_2$, such as shown in FIG. 19. At each side thereof the cross member 310 may include a generally downward extending portion such as a skirt 321. The skirt 321 may extend an entire length L of the cross member 310 between the frame 107 or may extend only a portion of the length L. In some embodiments, the length L may be less than or substantially equivalent to the total width of the load bed 109 of the towing vehicle 108.

The cross member 310 may include a plurality of apertures 322 extending therethrough. The cross member 310 may include two sets of plurality of apertures 322 that may each be laterally spaced from the aperture 115 on each side of the cross member 310, such as two apertures 322 as shown in FIG. 19. The apertures 322 may be of any appropriate shape and size such that a fastener (not shown) may be capable of being inserted into the apertures 322 and secured therein.

The gooseneck hitch 300 may include first and second beams 330, 332. The first and second beams 330, 332 may be laterally disposed from one other. The may result in the first and second beams 330, 332 being located on opposite sides of the gooseneck hitch 300. The first and second beams 330, 332 may be generally mirror images of one another, or may be generally different from one another. The first and second beams 330, 332 may extend an entire width $W_3$ of the gooseneck hitch 300.

Figure 26:
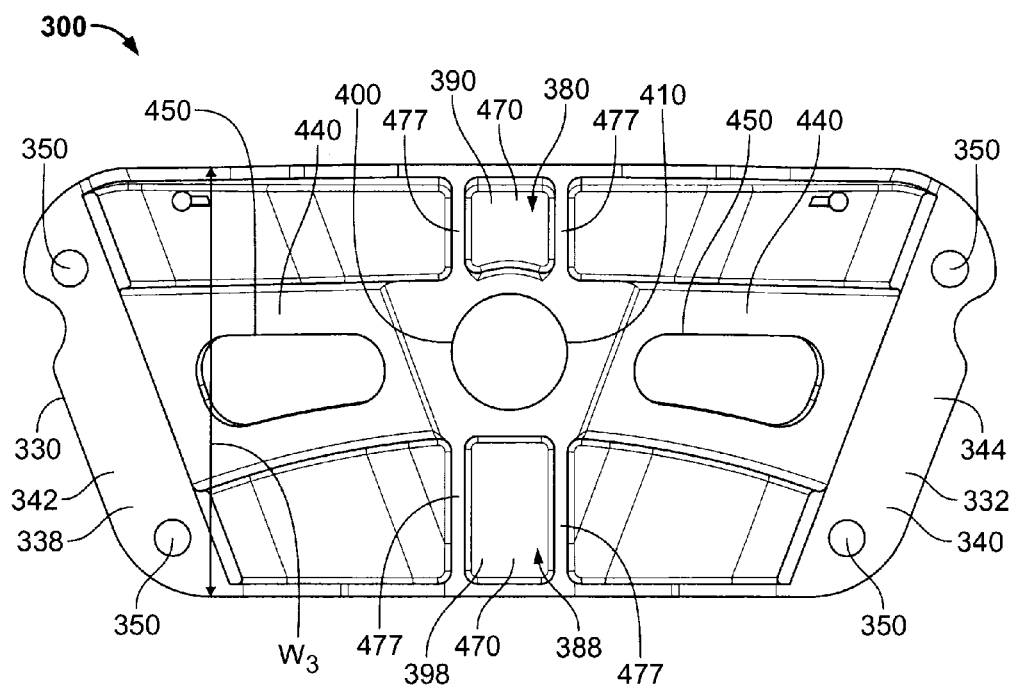
FIG. 26 is a bottom view of a gooseneck hitch.

The first and second beams 330, 332 may include top portions 334, 336 and bottom portions 338, 340, respectively. The top portions 334, 336 may be generally flat such that they are each capable of nestingly fitting either adjacent to or in relatively close proximity to the underside of the cross member 310. While the top surfaces 334, 336 are shown as being generally flat, they may be of any appropriate shape such that they nestingly fit within the underside of the cross member 310. The bottom portions 338, 340 of the first and second beams 330, 332 may have an open cavity 342, 344 such that there may be no generally hollow portion, an example of which is shown in FIG. 26.

The first and second beams 330, 332 may each include a plurality of apertures 350, which may extend from the top surfaces 334, 336 to the bottom surfaces 338, 340. The apertures 350 may be positioned predetermined distances from one another. In such embodiments, the apertures 350 may generally align with the apertures 322 in the cross member 310. The apertures 350 of the first and second beam structures 330, 332 may be shaped and sized to accept a fastener (not shown) such that the gooseneck hitch 300 may be selectively attached to cross member 310 secured to the frame 307 of the towing vehicle 108. While the first and second beams 330, 332 may be shown with two such apertures 350, it should be understood that any number of such apertures may be used without departing from the present teachings, including, without limitation one, two, three, four, five, etc. of such apertures.

The gooseneck hitch 300 may include first and second generally transverse rail portions 360, 368, respectively, that may be attached to the first and second beams 330, 332 in any appropriate manner. By way of a non-limiting example, the first and second rail portions 360, 368 may be integrally formed with the first and second beams 330, 332 as a monolithic unit. In some embodiments, the first and second rail portions 360, 368 may be attached to the first and second beams 330, 332 through casting the entire gooseneck hitch 300.

The first generally transverse rail section 360 may be generally rhombus in shape as shown. The second generally transverse rail section 368 may have a generally rhombus shape as shown. The second generally transverse rail section 368 may be positioned proximally to the rear of the towing vehicle 108. In a non-limiting example, the second generally transverse rail section 368 may be shorter than the first generally transverse rail section 360 to account for the position of the apertures 350 so that they may be positioned to generally align with the corresponding apertures 322 in the cross member 310. The cross member 310 may be attached to the frame 107 of the vehicle, which limits the available space for the gooseneck hitch 300. Accordingly, the length of the second generally transverse rail section 368 may prevent having to add more material to the gooseneck hitch 300 to appropriately position the apertures 350. This may reduce the overall weight of the gooseneck hitch 300. Further, the length of the second generally transverse rail section 368 may create additional space for the gooseneck hitch 300 to be secured under the towing vehicle 108.

While the generally rhombus shapes are shown, the first and second generally transverse rail section 360, 368 may be of any appropriate shape. In some embodiments, the position of the apertures 350 may be such that either of the first and second generally transverse rail sections 360, 368 may be curved, generally rectangular, longer or shorter, or any appropriate combination of such. Further, the first and second generally transverse rail section 360, 368 may both be generally curved. Further still, the first and second generally transverse rail sections 360, 368 may be generally rectangular. The present teachings are not limited to a particular shape and the first and second generally transverse rail sections 360, 368 may be of any appropriate shape.

The first and second generally transverse rail sections 360, 368 may include upper surfaces 370, 378 and bottom surfaces 380, 388. The upper surfaces 370, 378 may be generally flat. The generally flat upper surfaces 370, 378 may be shaped to nestingly fit the gooseneck hitch 300 adjacent to or in close proximity to the underside of the cross member 310. The bottom surfaces 380, 388 may have an open cavity 390, 398 such that there may be no generally hollow portion.

The gooseneck hitch 300 may include a receptacle 400 that may be attached to the first and second generally transverse rail sections 360, 368. The receptacle 400 may be integrally formed with the first and second generally transverse rail sections 360, 368 as a monolithic unit, such as by way of a non-limiting example, being cast therewith. The receptacle 400 may be capable of accepting and having selectively secured thereto the gooseneck hitch ball 120. The receptacle 400 may include a groove 402 that may be generally positioned radially around the periphery of the diameter of the receptacle 400. The groove 402 may be shaped and sized to engaging a locking mechanism (not shown) of the hitch ball 120, an example of which is shown and described in U.S. Pat. Nos. 8,011,685 and 6,616,168, both of which are hereby incorporated by reference.

The receptacle 400 may be positioned on the gooseneck hitch 300 such that when the gooseneck hitch 300 is selectively attached to the cross member 310, the receptacle 400 is generally aligned with the aperture 315 of the cross member 310. Further, the receptacle 400 may be positioned immediately below, immediately above, or generally planar with the cross member 310 or the load bed 109 of the towing vehicle 108 upon attachment of the gooseneck hitch 300 with the cross member 310.

The receptacle 400 may include a bottom portion 410 that may be generally flat surface 412. The generally flat surface 412 may provide room for the gooseneck coupler 300 to fit under the load bed 109 of the towing vehicle 108. Further, the configuration of the generally flat surface 412 may prevent the gooseneck hitch 300 from interfering with the axle of the towing vehicle 108. The profile of the gooseneck hitch 300 may be such that it is capable of efficiently and effectively fitting below the load bed 109 of the towing vehicle 108.

Figure 22:
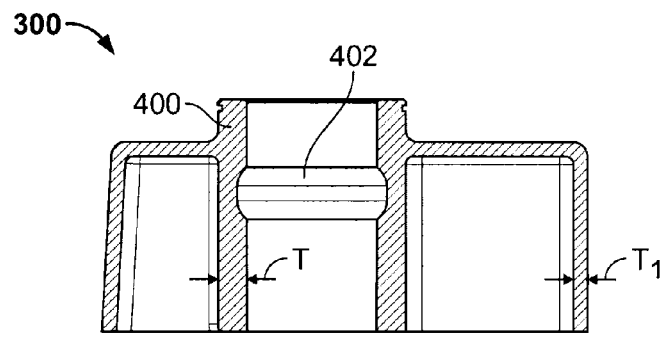
FIG. 22 is a cross sectional view of the gooseneck hitch of FIG. 21 along line 22-22.
Figure 23:
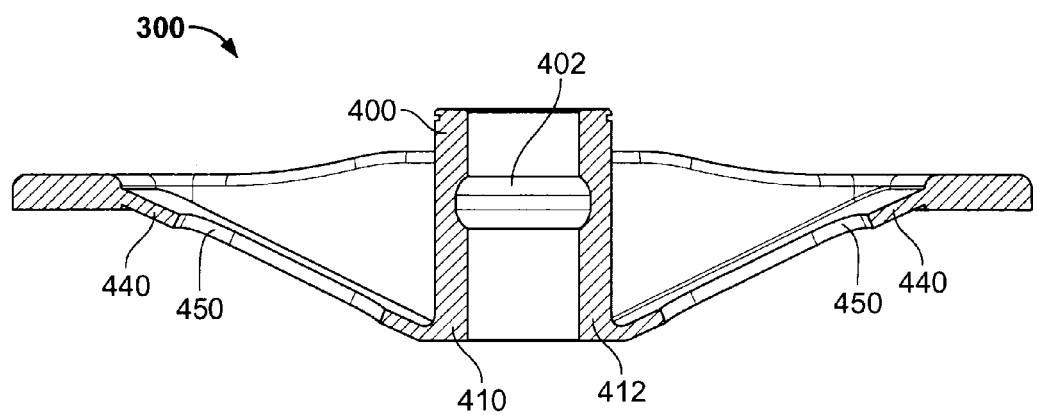
FIG. 23 is a cross sectional view of the gooseneck hitch of FIG. 21 along line 23-23.
Figure 24:
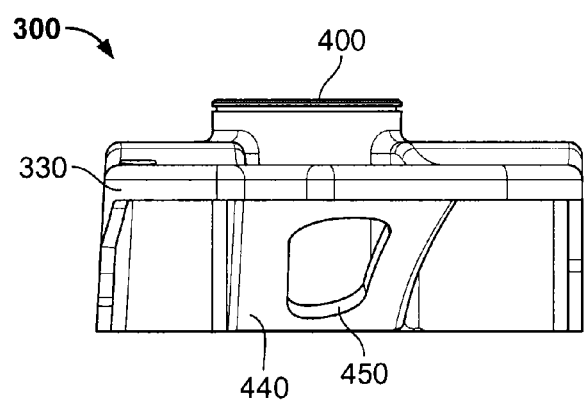
FIG. 24 is a side view of a gooseneck hitch.
Figure 25:
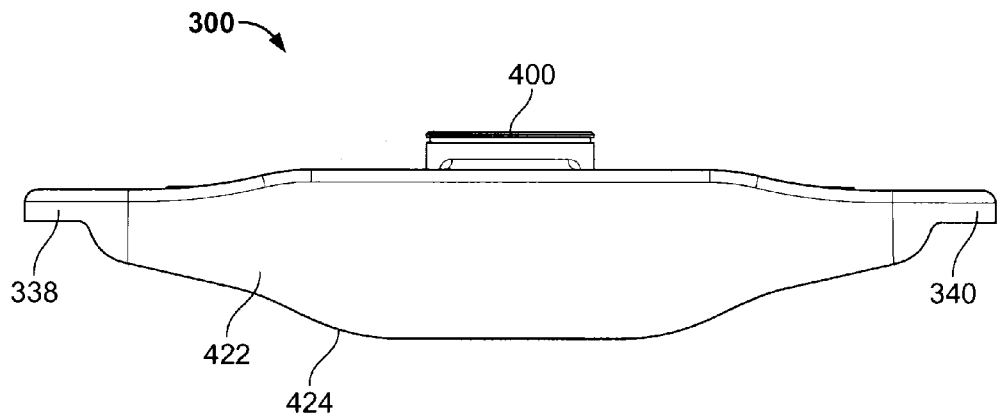
FIG. 25 is a front view of a gooseneck hitch.

In some embodiments, an example of which is shown in FIG. 22, the receptacle 400 may have a thickness T that may be generally greater than a thickness $T_1$ of the other components of the gooseneck hitch 300, such as the first and second beam 330, 334 and the first and second rails 360, 368. Further, the towing load applied to the gooseneck hitch 300 enters at the receptacle 400 and as the thickness T is greater than $T_1$, the gooseneck hitch 300 may be capable of operating under greater loads.

The gooseneck hitch 300 may include a pair of side curtains 422 that may be attached to and may extend from each of the first and second generally transverse rail sections 360, 368. The side curtains 422 may be integrally formed with the first and second generally transverse rail sections 360, 368 as a monolithic unit, such as by way of a non-limiting example being cast therewith. The side curtains 422 may each include bottom portions 424 that may be generally flat. The bottom portions 424 of the side curtains 422 may generally be coterminous with the receptacle 400 and more specifically with the flat surface 412 of the bottom surface 410 of the receptacle 400.

The gooseneck hitch 300 may include web portions 440 that may be generally positioned between and attached to the first and second beam sections 330, 334, the first and second generally transverse rail sections 360, 368, and the receptacle 400. The web portions 440 may be integrally formed with the first and second beam sections 330, 334, the first and second generally transverse rail sections 360, 368 and the receptacle 400 as a monolithic unit, such as by way of a non-limiting example being cast therewith. The web portions 440 may be provided to add strength to the gooseneck hitch 300. The web portions 440 may generally reduce the stress that may be applied during use of the gooseneck hitch 300.

The web portions 440 may each include an opening 450. The openings 450 may be of any appropriate shape and size. By way of a non-limiting example and as shown in FIGS. 19-21, 24 and 26 the openings 450 may be of a generally kidney shape. However, the openings 450 may be generally circular, rectangular, oval, square, polygonal, or any other appropriate shape and size—the present teachings are not limited to a specific configuration. The openings 450 may be provided to reduce the overall weight of the gooseneck hitch 300 while maintaining the strength thereof. The openings 450 may be formed in the web portions 440 in any appropriate manner. By way of a no-limiting example, the openings 450 may be formed when the web portions 440 are cast.

The gooseneck hitch may include a plurality of ribs 477 of any appropriate shape and size that may be positioned on an underside 470 of the gooseneck hitch 300. The ribs 477 may be located at any appropriate position. The ribs 477 may provide additional strength to the gooseneck hitch 300.

The gooseneck hitch 300 may be formed as a single unitary member—i.e., a monolithic unit—such as by way of a non-limiting example, being casted, forged, hydro-formed or the like. Once formed, the gooseneck hitch 300 may be heat treated to any appropriate strength and hardness, especially after casting thereof. The gooseneck hitch 300 may be free of having any components welded thereto, which may result in the gooseneck hitch 300 being generally weld free. In addition, the gooseneck hitch 300 may avoid the use or include any enclosed cavities as many of the prior art gooseneck hitches do. This may lead to an overall weight reduction of the gooseneck hitch 300 while maintaining or potentially improving the rating and towing capabilities of the gooseneck hitch 300.

Further, the shape of the gooseneck hitch 300 may be such that it may generally fit under the load bed 109 of the towing vehicle 108 within the frame 107 and axle thereof. The gooseneck hitch 300 when attached with the towing vehicle 108, or more specifically, when attached to the cross member 310 may be positioned within the skirt 321 of the cross member 310. This may result in the gooseneck hitch 300 fitting within a compact area below the load bed 109 of the towing vehicle 108. Specifically, the width $W_3$ of the first and second beams 330, 332 of the gooseneck hitch 300 may be less than the width $W_2$ of the cross member 310. Therefore, the entire profile of the gooseneck hitch 300, i.e., the first and second beams 330, 332 along with the first and second generally transverse rail sections 360, 368, may fit entirely below the cross member 310 and between the skirt 321 of the cross member 300. This permits the gooseneck hitch 300 to be operatively positioned relative to the towing vehicle 108 such that it is not in the way or otherwise does not interfere with the other components of the towing vehicle 108. In some embodiments, no portion of the gooseneck hitch 300 may extend beyond the skirt 321 of the cross member 310, or stated differently extend beyond the width $W_2$ of the cross member 310.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A gooseneck hitch attachable to a single cross member secured to a frame below a load bed of a vehicle, the cross member having a width and a recess with an aperture on a top side portion of the single cross member, the gooseneck hitch comprising:
    a longitudinal member selectively attachable to the single cross member below the load bed;
    a fastener insertable through the longitudinal member into the aperture of the single cross member, wherein the fastener is capable of selectively attaching the longitudinal member with the single cross member and the fastener is capable of being positioned in the recess of the single cross member;
    a transverse member monolithically formed with the longitudinal member and extending from the longitudinal member;
    a receptacle monolithically formed with the transverse member, wherein the receptacle is capable of accepting a hitch ball selectively secured thereto;
    a second longitudinal member monolithically formed with the transverse member and positioned transversely from the longitudinal member, wherein the longitudinal member and second longitudinal member have widths less than the width of the single cross member; and
    a second transverse member monolithically formed with the longitudinal member and second longitudinal member and positioned longitudinally from the transverse member.

2. The gooseneck hitch of claim 1, wherein the longitudinal member is attachable to a bottom surface of the single cross member.

3. The gooseneck hitch of claim 1, wherein the longitudinal member, second longitudinal member, transverse member, second transverse member and receptacle are monolithically formed through casting.

4. The gooseneck hitch of claim 1, further comprising a plurality of fasteners capable of securing the second longitudinal member with the single cross member below the load bed.

5. The gooseneck hitch of claim 4, wherein the longitudinal member and second longitudinal member fit within the width of the single cross member upon attachment to the single cross member.

6. The gooseneck hitch of claim 1, wherein the longitudinal member and second longitudinal member are positionable adjacent a bottom surface of the single cross member.

7. The gooseneck hitch of claim 1, wherein the longitudinal member and transverse member are free of a hollow tubular portion.

8. The gooseneck hitch of claim 1, further comprising at least one web generally positioned between the longitudinal member, transverse member and receptacle.

9. The gooseneck hitch of claim 8, wherein the web is monolithically formed with the longitudinal member, transverse member and receptacle.

10. The gooseneck hitch of claim 8, wherein the web includes a recessed portion and an aperture formed therein.

11. The gooseneck hitch of claim 1, wherein the longitudinal member, transverse member and receptacle are weld free.

12. A gooseneck hitch attachable to a cross member secured to a frame below a load bed of a vehicle, the cross member having a width and a recess with an aperture on a top side portion of the cross member, the gooseneck hitch comprising:
    first and second longitudinal members transversely spaced from one another and selectively attachable to the cross member, wherein the first and second longitudinal members have a longitudinal member width less than the width of the cross member;
    a fastener insertable through the first longitudinal member into the aperture of the cross member, wherein the fastener is capable of selectively attaching the first longitudinal member with the cross member and the fastener is capable of being positioned in the recess of the cross member;
    first and second transverse members attached with and extending in a direction generally normal from the first and second longitudinal members;
    a receptacle monolithically formed with the first and second transverse members, wherein the receptacle is capable of accepting a hitch ball selectively secured thereto; and
    wherein attachment of the first and second longitudinal members with the first and second transverse members is weld free.

13. The gooseneck hitch of claim 12, wherein the first and second longitudinal members and first and second transverse members are monolithically formed through casting.

14. The gooseneck hitch of claim 13, wherein the receptacle is monolithically formed with the first and second transverse members through casting.

15. The gooseneck hitch of claim 12, further comprising at least one rib formed with an underside of the first and second transverse members.

16. The gooseneck hitch of claim 12, further comprising first and second webs monolithically formed between the first and second longitudinal members, first and second transverse members, and receptacle, wherein the first and second webs include a recessed portion and an aperture formed therein.

17. The gooseneck hitch of claim 12, wherein the first and second longitudinal members and first and second transverse members generally fit within the width of the cross member upon attachment of the first and second longitudinal members to the cross member.

18. A towing vehicle comprising:
    a load bed;
    a frame positioned below the load bed;
    a cross member attached to the frame and positioned below the load bed, the cross member having a perimeter, a topside having a recess and an aperture and an underside;
    a gooseneck hitch attached to the cross member below the load bed, the gooseneck hitch comprising:
        a longitudinal member attached to the cross member, the longitudinal member positioned in proximity to the underside of the cross member;
        a fastener inserted through the longitudinal member into the aperture of the cross member, wherein the fastener attaches the longitudinal member with the cross member and the fastener is positioned in the recess of the cross member;
        at least one transverse member monolithically formed with the longitudinal member and extending in a direction generally normal from the longitudinal member; and a receptacle monolithically formed with the at least one transverse member, wherein the receptacle is capable of accepting a hitch ball selectively secured thereto.

19. The towing vehicle of claim 18, wherein the gooseneck hitch has a gooseneck perimeter, whereby upon attachment of the gooseneck hitch with the cross member the gooseneck perimeter fits within the perimeter of the cross member.

20. The towing vehicle of claim 18, wherein the cross member includes a skirt extending along at least a portion of the perimeter, whereby the gooseneck hitch fits within the skirt.

21. The towing vehicle of claim 18, further comprising at least one rib formed with an underside of the at least one transverse member of the gooseneck hitch.

22. The towing vehicle of claim 18, further comprising a web monolithically formed between the longitudinal member, transverse member, and receptacle, wherein the web includes a recessed portion and an aperture formed therein.

23. The towing vehicle of claim 18 further comprising:
a second recess and second aperture positioned on the topside of the cross member and spaced from the recess and aperture on the cross member;
wherein the gooseneck hitch further comprises a second longitudinal member attached to the cross member opposite the longitudinal member, the second longitudinal member positioned in proximity to the underside of the cross member; and
a second fastener inserted through the second longitudinal member into the second aperture of the cross member, wherein the second fastener attaches the second longitudinal member with the cross member and the second fastener is positioned in the second recess of the cross member.

* * * * *